United States Patent [19]
Wood

[11] 3,826,529
[45] July 30, 1974

[54] TRUCK BODY WITH SUSPENSION RACK

[76] Inventor: Robert J. Wood, 3938 Sassafras St., Erie, Pa. 16508

[22] Filed: May 12, 1972

[21] Appl. No.: 252,564

[52] U.S. Cl............ 296/37 R, 214/83.24, 296/24 R
[51] Int. Cl......................... B60p 1/52, B62d 33/04
[58] Field of Search...... 296/37 R, 24 R; 214/83.24; 224/29 R, 42.42 R

[56] References Cited
UNITED STATES PATENTS
| | | |
|---|---|---|
| 2,094,401 | 9/1937 | Girl............................... 296/37 R X |
| 2,741,376 | 4/1956 | Hinds.............................. 214/83.24 |
| 2,784,027 | 3/1957 | Temp............................ 296/37 R X |
| 3,471,045 | 10/1969 | Panciocco........................ 214/83.24 |

FOREIGN PATENTS OR APPLICATIONS
| | | | |
|---|---|---|---|
| 1,042,084 | 9/1966 | Great Britain..................... | 296/24 R |
| 504,594 | 12/1954 | Italy................................... | 296/24 R |
| 162,622 | 4/1955 | Australia............................ | 296/24 R |

*Primary Examiner*—Robert J. Spar
*Assistant Examiner*—Leslie J. Paperner

[57] ABSTRACT

An automotive vehicle body, such as a pickup truck, with a rack for tools or the like. The rack is in the form of a cabinet and supported on a track. The rack can be pulled completely from the vehicle to provide access to the contents of the rack.

2 Claims, 6 Drawing Figures

PATENTED JUL 30 1974 3,826,529

TRUCK BODY WITH SUSPENSION RACK

GENERAL STATEMENT OF INVENTION

Vehicles used by plumbers, electricians and tradesmen usually have racks supported in the vehicles that are relatively inaccessible to the tradesmen. The present invention provides a rack in combination with a vehicle, such as a pickup truck. The rack is supported on tracks so that the rack is readily accessible to the user.

OBJECTS OF THE INVENTION

It is an object of the invention to provide an improved combination vehicle and rack construction.

Another object of the invention is to provide a combination rack and supporting track on a vehicle.

Another object of the invention is to provide a pickup truck in combination with a track.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

DETAILED DESCRIPTION OF THE DRAWINGS

Figure 1:
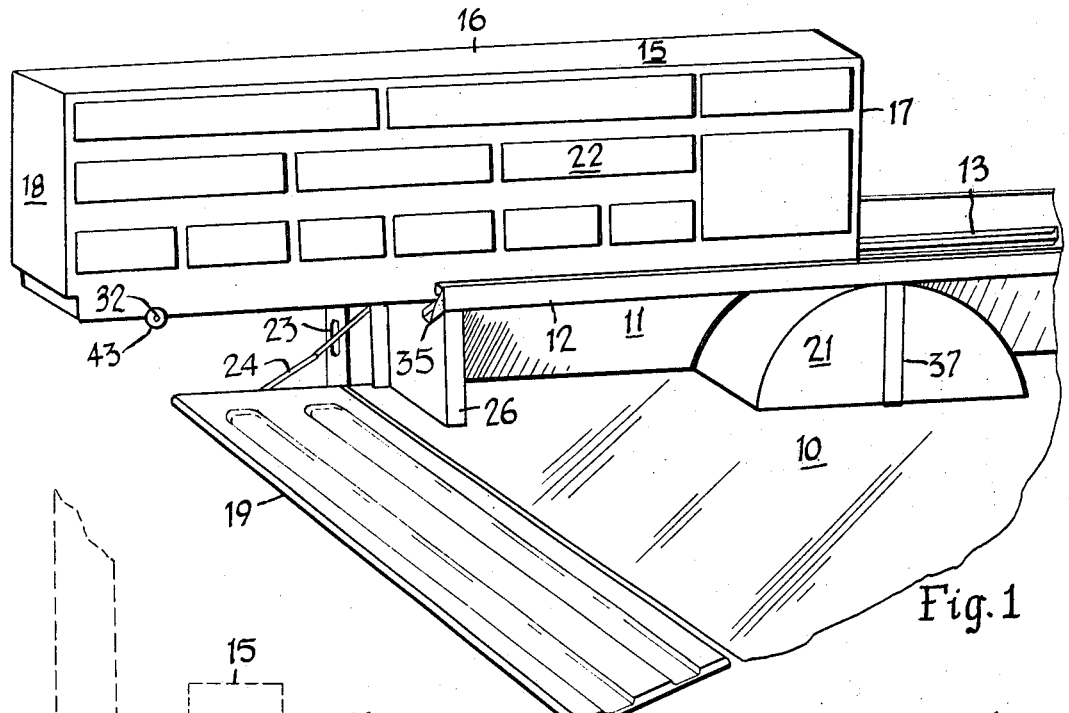
FIG. 1 is a partial isometric view of a vehicle according to the invention.
Figures 2, 4, 5:
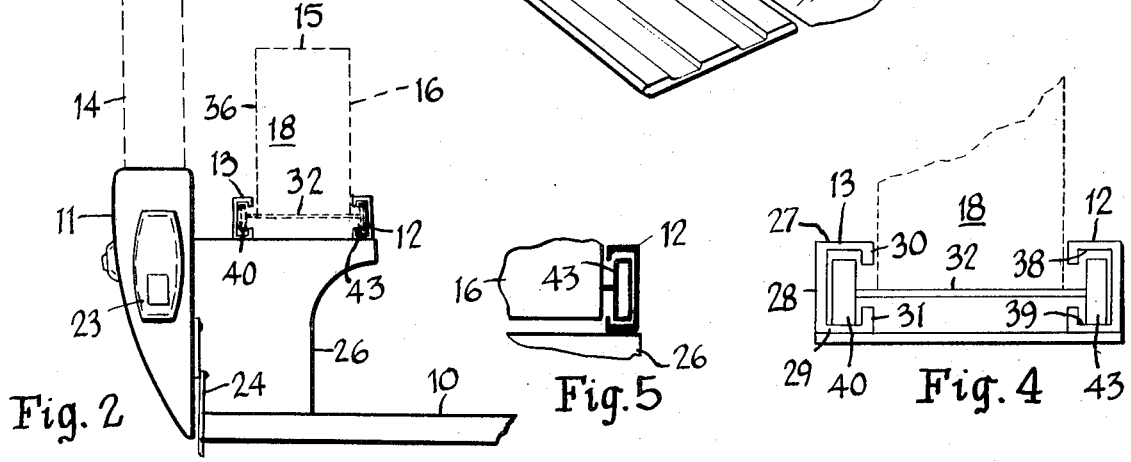
FIG. 2 is a partial rear view of the vehicle with the rack in phantom.
FIG. 4 is an end view of the track.
FIG. 5 is a partial end view of the track and rack.
Figure 3:
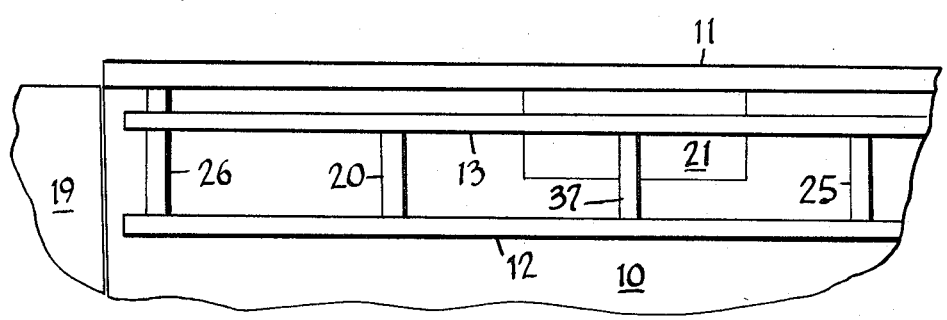
FIG. 3 is a partial top view of the vehicle and track with the rack removed.
Figure 6:
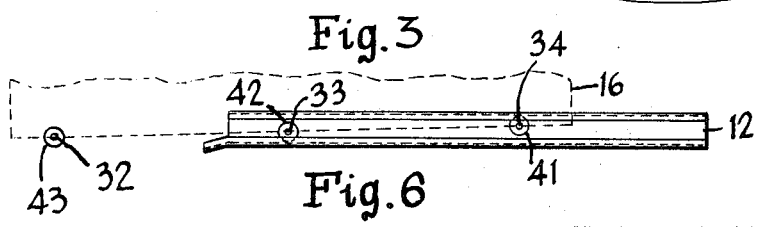
FIG. 6 is a partial side view of the track with the rack in phantom.

The vehicle is indicated generally at 10 and it shows a pickup truck of the type familiar to those skilled in the art. The pickup truck has a truck bed with side boards 11 and a wheel well 21. The truck bed may have lights 23 and be enclosed as shown in phantom in FIG. 2. The fixed tracks or channels 12 and 13 have top sides 27, bottom sides 29, outer sides 28, inner side tops 30 and inner side bottoms 31. The space between the top 30 and bottom 31 allows the passage of axles 32, 33 and 34. The axles have rollers 40, 41, 42 and 43. The fixed tracks 12 and 13 are supported on the vehicle body in spaced relation to each other. The rollers indicated at 40, 41, 42 and 43 are supported in the tracks 12 and 13. It will be noted that the fixed tracks 12 and 13 are in the form of channels with the open sides facing toward each other. The axles 32, 33 and 34 support a rack 16 which has a top 15, a first end 18 and a second end 17, a back 36 and is divided into compartments 22. The end gate 19 is hingedly connected to the back of the bed of the truck and is held in horizontal position by the brace 24, which is pivoted to the side board and to the end gate. The fixed tracks 12 and 13 are supported at their ends on the support 26 and by intermediate support 37. The fixed tracks 12 and 13 are held in fixed relation to each other by cross members 20 and 25. When the rack 16 is moved rearwardly in relation to the vehicle 10, the rollers 40 and 43 move beyond the end of tracks 12 and 13. When this happens, wheels 42 are still riding on the inner bottom sides 39 on the tracks but wheels 41 are now riding on the inner tops 38 of the tracks. When the rack 16 is rolled back into the vehicle 10, the wheels 40 and 43 are assisted back up to tracks 12 and 13 by the downward sloping track ends 35. The compartments 22 may be laid out to suit the individual taste of the user.

The tracks are designed like those commonly used to support garage doors but are made heavier to support heavy tools, parts, and pipe fittings that are commonly carried by plumbers, carpenters, and other mechanics. Full and easy access is possible to the contents of the rack.

The foregoing specification sets forth the invention in its preferred practical forms but the structure shown is capable of modification within a range of equivalents without departing from the invention which is to be understood is broadly novel as is commensurate with the appended claims.

I claim:

1. A vehicle body in combination with a rack,
said body comprising a truck bed having a bottom and sides spaced from each other,
longitudinally spaced supports resting on said bottom and attached to one of said sides,
longitudinally extending channel shaped tracks spaced above said bottom a substantial distance and resting on said supports and attached thereto,
said channel shaped tracks opening toward each other,
said tracks and said rack being disposed on the same side of the longitudinal centerline of said truck bed as the side of said truck bed to which said supports are attached,
spaced rollers attached to said rack and disposed in said channel tracks,
said rollers comprising first rollers fixed to a first end of said rack, second rollers fixed to an intermediate part of said rack, and third rollers disposed at a second end of said rack,
said second rollers engage the bottom of said channels,
said third rollers engage the top of said channels whereby said rack is restrained to move in and out of said vehicle in a path parallel to said tracks,
and said rack having a plurality of openings in the side adjacent the center of said truck whereby access can be had to the inside of said rack.

2. The combination recited in claim 1 wherein a stop is provided on said rack adapted to engage a stop on said tracks limiting the outward movement of said rack.

* * * * *